(12) United States Patent
Dias et al.

(10) Patent No.: US 6,248,797 B1
(45) Date of Patent: Jun. 19, 2001

US006248797B1

(54) SUPERCRITICAL CARBON DIOXIDE EXTRACTION OF CONTAMINANTS FROM ION EXCHANGE RESINS

(76) Inventors: Shelton A. Dias; Walter Shapka, both of 800 Kipling Avenue, Toronto, Ontario (CA), M8Z 6C4

( * ) Notice: Subject to any disclaimer, the term of this patent is extended or adjusted under 35 U.S.C. 154(b) by 0 days.

(21) Appl. No.: 09/312,050

(22) Filed: May 17, 1999

(51) Int. Cl.$^7$ ........................................................ C08J 5/20

(52) U.S. Cl. ............................ 521/26; 562/485; 562/494; 562/580; 562/593

(58) Field of Search ............................... 521/26; 562/485, 562/494, 580, 593

(56) References Cited

U.S. PATENT DOCUMENTS

| 4,061,566 | 12/1977 | Modell . |
| 4,250,331 | * 2/1981 | Shimshick ............................ 562/485 |
| 4,698,153 | * 10/1987 | Matsuzaki et al. ................... 210/192 |
| 4,703,105 | 10/1987 | Allada . |
| 4,902,780 | * 2/1990 | Bourrain et al. ...................... 528/483 |
| 5,695,973 | * 12/1997 | Subbiach .............................. 435/155 |

FOREIGN PATENT DOCUMENTS

| 195 45 100 | 6/1997 | (DE) . |
| WO 84/02291 | 6/1984 | (WO) . |

OTHER PUBLICATIONS

J.R. Stahlbush, R,M. Strom, J.B. Henry and N.E. Skelly, "Prediction and Identification of Leachables from Cation Exchange Resins",Proceedings of the 48$^{th}$ International Water Conference, Engineering Society of Western PA, Pittsburgh, 67, (1987).

J.R. Stahlbush and R.M. Strom, "Decomposition Mechanism for Cation Exchange Resins", *Reactive Polymers*, 13, pp 233–240, 1990.

S. Fisher and G. Otten, "What Really Happens to Organics in Water Treatment Systems", Proceedings of the 39$^{th}$ International Water Conference, Engineering Society of Western PA, Pittsburgh, pp 420–426, (1978).

S.A. Fisher, "Leachables vs Ionic Leakage in Powdered Resin Systems", Proceedings of the 49$^{th}$ International Water Conference, Engineering Society of Western PA, Pittsburgh, pp 68–79, (1988).

S.A. Fisher and G. Otten, "Extractables in New Resins: A further Look at What They are and What Becomes of Them", Proceedings of the 47$^{th}$ International Water Conference, Engineering Society of Western PA, Pittsburgh, pp 169–176, (1986).

S.J. Poirier, "The New Role of TOC Analysis in Pure Water System Management", The 49$^{th}$ Annual Semiconductor Pure Water Conference, Transcripts (1985), p 197.

R.R. Harries and M. Ball, "Equilibrium Versus Kinetics in Water Purification". In: P.A. Williams and M.J. Hudson, eds. "Recent Developments in Ion Exchange", Ed Elsevier Applied Science, (ISBN 1–85166–101–8), 1987: 402–418.

F.S. Brooks and M.A. Seguin, "Report on the Use of Ion Exchange in Nuclear Service in Ontario Hydro Nuclear Stations", Ontario Hydro—Design and Development Division Report No. 80016 (Nuclear Materials Management), Feb. 1980.

Clarence D. Colley, Prepared Discussion of IWC –90–19, "Comparison of Operational Data from Three Type I Gel Anion Resins", Proceedings of the International Water Conference, Pittsburgh, Penn., Oct. 21–24, 1990.

Wataru Agui, Masahito Takeuchi, Masahiko Abe, and Keizo Ogino, "Fundamental Study on the Production of Ultrapure Water VIII: Removal of Leachables from Mixed–Bed Ion Exchange Resins", Bulletine of the Chemical Society of Japan, vol. 63, No. 10, pp 2872–2876 (1990).

Ontario Hydro Standard Specification No. M–678–86, Jan. 1986, and Draft No. 1 of Revision to Standard Specification for Resin, Ion Exchange, Nuclear Grade Type: Strong Acid/Strong Base, Material Management Department Document No. M–678–xx (not issued yet), File 178.2–929–7, Job S0193, Dec. 15, 1988.

Wataru Agui, Masahito Takeuchi, Masahiko Abe, and Keizo Ogino, "Removal of Leachables from Strong Acid Cation Exchange Resins", *Journal of Japan, Oil Chemists' Society* (Yukagaku), vol. 38, No. 5, p 405–414, 1989.

S.L. Wiser, Y.H. Lee G.R. Stroh, and M. O'Brien, "Removal of Organics from Secondary Make–up Water", Proceedings of the 46$^{th}$ International Water Conference, pp 1–17, 1985.

L.S. Hartjen, "Progress in the Removal of Organics Present in Utility Water Systems", Proceedings of the 46$^{th}$ International Water Conference, Engineering Society of Western PA, Pittsburgh (1985), Paper No. IWC–85–22.

Supercritical Fluid Science and Technology, ed Keith P. Johnston and Johannes M.L. Penninger, ACS Symposium Series 406, American Chemical Society, Washington, DC 1989 (ISBN 0–8412–1678–9).

(List continued on next page.)

*Primary Examiner*—David W. Wu
*Assistant Examiner*—Tanya Zalukaeva
(74) *Attorney, Agent, or Firm*—Ridout & Maybee LLP

(57) ABSTRACT

A method for extracting leachable contaminants from ion exchange resins comprises exposing the resin to supercritical carbon dioxide for a sufficient interval of time to allow at least a portion of the leachable contaminant to be solubilized by the supercritical carbon dioxide; followed by removal from the resin of the supercritical carbon dioxide having the leachable contaminant dissolved therein. The method is particularly useful for removing organic contaminants, which may or may not contain sodium or chlorine, from the resin, to thereby provide ion exchange resins which are suitable for critical use applications in the nuclear, electronics, pharmaceutical and food industries.

16 Claims, 8 Drawing Sheets

OTHER PUBLICATIONS

F.R. Groves, Jr., B. Brady, and F.C. Knopf, "State-of-the-Art on the Supercritical Extraction of Organics from Hazardous Wastes", CRC Critical Reviews in Environmental Control, vol. 15, Issue 3, p 237–274, 1985.

J.C. Via and L.T. Taylor, "Solving Process Problems with Supercritical Fluid Extraction". ChemTech, Nov., 1993, p 38.

M.A. McHugh, V.J. Krukonis, and G.T. Hong (Ed), "Supercritical Fluid Extraction: Principles and Practice", $2^{nd}$ Edition, Butterworth–Heinemann, 1993 (ISBN 0–7506–9244–8).

R.A. Ferrieri, J.S. Fowler and A.P. Wolf, "Use of Supercritical Carbon Dioxide Fluid as a Solvent for the Purification of PET Radiotracers", International Workshop on Targetry and Target Chemistry, sponsored by DOE and DOHHS, Sep. 20–24, 1993, Upton, N.Y., Conf.–9309170–4; BNL–60338.

H.M. Smith et al, "Contaminant Removal from Solid Waste by Supercritical Carbon Dioxide", Pollution Prevention Conference, sponsored by USDOE (CONF–940578–1), Denver, CO, May 3–5, 1994; Report No. SAND–94–1119C.

H.M. Smith et al, "The Use of Supercritical Carbon Dioxide for Contaminant Removal from Solid Waste", paper presented at the Joint Army, Navy, NASA, Air Force Environmentally Benign Cleaning and Degreasing Technical Workshop (sponsored by USDOE), Indian Head, MD Jun. 14–15, 1994, Report No. SAND–94–1444C; CNF–9406181–2, Order No. DE94013342.

F.P. Scanlan and J.F. Muller, An Analytical Investigation of the Thermal Degradation of a Cation–Exchange Resin—Part 2, *Journal of Analytical and Applied Pyrolysis*, vol. 16, p 269–289, 1989.

Shing–Jen Shiao and Chiao–Ming Tsai, "Stability of Anion Resin", *Nuclear Science Journal*, vol. 27, No. 6, p 523–536, 1990.

R.F. Cross, J.L. Ezzell, N.L. Porter, and B.E. Richter, "Fluid Composition Sources and Flexibility in Supercritical Fluid Extraction", American Laboratory, Aug. 12–17, 1994.

B.R. Nott, "Evaluation of Nuclear Grade Ion Exchange Resins", Ontario Hydro Research Division Report No. 81–42–H, Mar. 4, 1981.

* cited by examiner

SCHEMATIC DIAGRAM OF SUPERCRITICAL CARBON
DIOXIDE EXTRACTION SET-UP

Before

After

Before

After

Effect of SC-CO$_2$ Extraction on C-14 Uptake by Resins (Ambersep 440E/OH) (Before Regeneration)

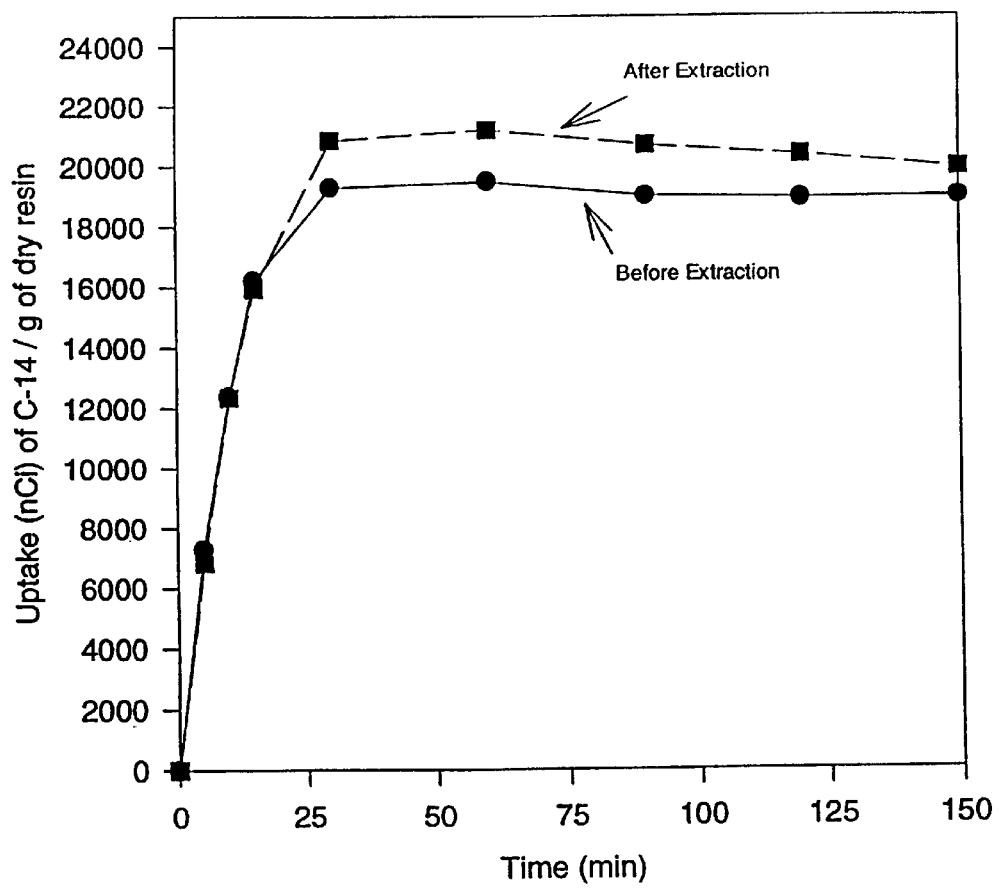

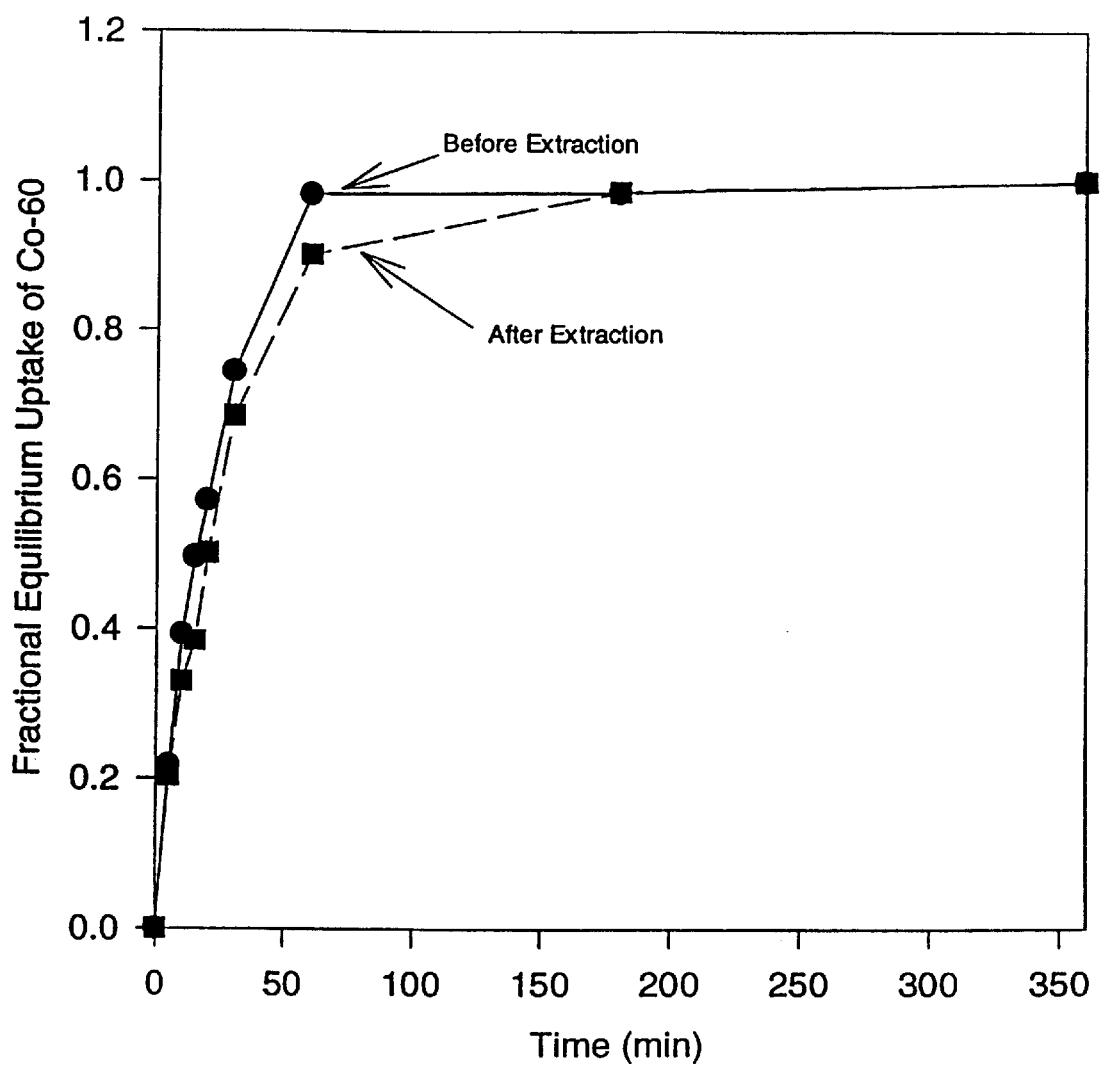

SUPERCRITICAL CARBON DIOXIDE EXTRACTION OF CONTAMINANTS FROM ION EXCHANGE RESINS

FIELD OF THE INVENTION

The present invention relates to a method of removing contaminants from ion exchange resins, and more specifically to the use of supercritical carbon dioxide for the removal of leachable organic and inorganic materials from commercial ion exchange resins to thereby produce ion exchange resins acceptable for use in critical applications.

BACKGROUND OF THE INVENTION

Ion exchange resins are widely used in the production of highly pure water in the nuclear, electronics (semi-conductor), pharmaceutical and food industries. In the nuclear industry, for example, ion exchange resins are used for purification of nuclear process water.

The problem exists that commercial grade ion exchange resins contain varying quantities of organic and inorganic impurities which have a tendency to leach out of the resin during use. Many of these impurities arise during manufacture of the resin, and include monomers and oligomers of the polymer from which the resin beads are formed, as well as impurities in the starting materials. These impurities may become functionalized, for example, with sulphate or amino groups during functionalization of the resin.

Due to the presence of leachable impurities, commercial ion exchange resins must be treated prior to use in critical applications where extraneous organic materials are unacceptable. Presently used purification methods include a variety of proprietary techniques, most of which are based on extraction of leachable impurities by organic solvents. In one of these methods, the resin is washed with a series of solvents of decreasing polarity. In addition to being slow, costly and wasteful, this process suffers from a number of other disadvantages. Firstly, it is not very effective. Organic solvent molecules are relatively bulky and cannot effectively penetrate into the interior of the cross-linked resin beads to leach out the impurities contained therein. Secondly, solvent treatments may require high temperatures and pressures, which may damage the integrity of the resin beads, for example by de-crosslinking, or facilitating loss of functional groups. Thirdly, the organic solvents used to wash the resin may be absorbed by the resin beads, resulting in further contamination.

Therefore, there is a need for a more economical and effective method for removing leachable impurities from commercial ion exchange resins.

SUMMARY OF THE INVENTION

The present invention overcomes the above difficulties by providing a method for removing unwanted contaminants from ion exchange resins in which resins are exposed to supercritical carbon dioxide for a period of time sufficient to permit leachable impurities to diffuse out of the resin. The inventors have found that supercritical carbon dioxide is capable of reducing the levels of impurities in commercial ion exchange resins to levels low enough to permit the use of the treated resins in critical applications in the nuclear, semi-conductor, pharmaceutical and food industries.

The high density, high solvent power and low viscosity of supercritical carbon dioxide allow it to quickly diffuse throughout the entire resin bead, and solubilize the leachable impurities contained in the resin structure. The degree to which leachable impurities are removed by the method of the present invention suggests that supercritical carbon dioxide removes impurities trapped deep inside the cross-linked matrix of the resin beads. This is surprising in that many of the impurities contained within the resin beads are relatively bulky organic molecules which became trapped in the cross-linked matrix during its formation. One would expect that such impurities could only be removed slowly, if at all.

The inventors believe that, during treatment with super-critical carbon dioxide, the cross-linked cage structure of the bead is expanded temporarily under pressure. This expansion is believed to result in escape of organic materials from the interior of the resin bead which ordinarily would leach out very gradually over time.

Furthermore, the inventors have surprisingly found that treatment of ion exchange resins by the method of the present invention results in a resin which has a noticeably higher initial effectiveness than untreated or conventionally treated commercial resins. The inventors believe that this is due to removal of organic impurities on the surface of the bead, which have the effect of reducing the initial activity of the resin.

BRIEF DESCRIPTION OF THE DRAWINGS

The invention will now be described, by way of example only, with reference to the following drawings, in which:

FIG. 6 is a graphical representation of the effect of supercritical carbon dioxide extraction on the C-14 capacity of Ambersep 440E/OH ion exchange resin after regeneration to the OH form; and FIG. 7 is a graphical representation of the effect of supercritical carbon dioxide extraction on Co-60 uptake by Amberlite IR 120 Plus ion exchange resin.

DETAILED DESCRIPTION OF PREFERRED EMBODIMENTS

Figure 1A:
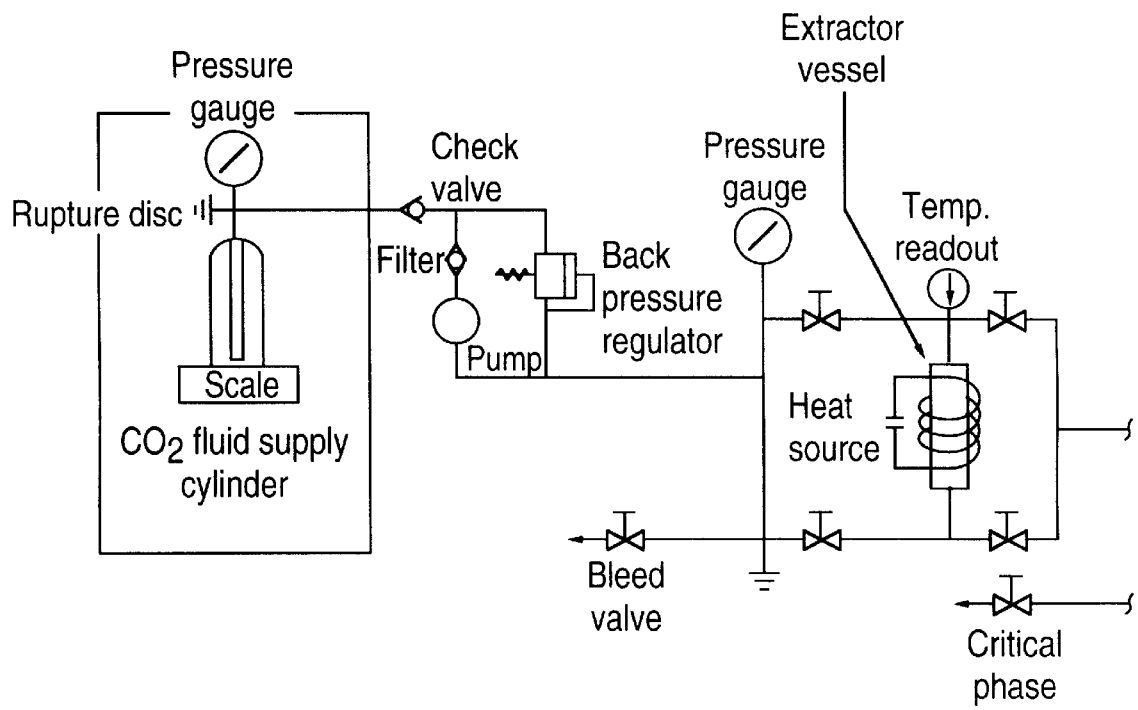
FIG. 1 is a schematic view of the supercritical carbon dioxide extraction apparatus used in the Examples.

The method of the present invention may preferably be used to reduce the amounts of at least three types of impurities in ion exchange resins, namely functionalized or unfunctionalized hydrocarbon molecules, chlorine-containing impurities and sodium-containing impurities. These three categories may overlap to some degree since a portion of the hydrocarbon impurities may contain chlorine and/or sodium.

Ion exchange resin beads are generally comprised of a cross-linked polymer matrix formed by polymerization of styrene combined with as a cross-linking agent such as divinylbenzene. The polymerized product invariably contains amounts of unreacted monomers and oligomers, and these are the main sources of hydrocarbon impurities. Other sources of impurities include those contained in the monomeric starting materials used to form the resin beads, as well as other reagents added during the polymerization, for example to control reactivity. During functionalization of the resin, some of these impurities may also undergo functionalization, for example by sulfonation (cation resin) or, to a lesser extent, by aminomethylation (anion resin).

Previous studies (for example Wataru Agui, Masahito Takeuchi, Masahiko Abe, and Keizo Ogino, "A Removal of Leachables from Strong Acid Cation Exchange Resins", *Journal of Japan. Oil Chemists' Society* (Yukagaku), Vol. 38, No. 5, p 405–414, 1989) have identified several organic impurities in strong acid cation exchange resins ranging in molecular weights from about 500 to about 5,000, and have also revealed the presence of lower molecular weight compounds such as monomeric aromatic sulphonates such as p-sulphobenzoic acid and p-hydroxybenzenesulphonic acid.

The quantities of organic impurities present in an ion exchange resin is usually expressed as the level of total organic carbon (TOC). Commercially available "standard grade" resins generally contain relatively high TOC levels, often exceeding 10 mgC/dm$^3$ (Clarence D. Colley, Prepared Discussion of IWC -90-19, "A Comparison of Operational Data from Three Type I Gel Anion Resins", Proceedings of the International Water Conference, Pittsburgh, Pa., Oct. 21–24, 1990). High TOC levels in a resin can cause unwanted colour in the process water, and generally render such resins unsuitable for critical applications.

Government regulations pertaining to the use of ion exchangers and adsorbents for the processing of water, food, beverages, pharmaceutical and medical products are discussed in a recent overview (R. Kunin, "Introductory Overview", *Reactive Polymers*, Vol.24, No.2, pp.79–89, 1995).

In the preparation of anion exchange resins, chloromethylation is an essential intermediate step prior to functionalization with amines, and is the likely source of various chlorine containing organic compounds which are typically found in the resin matrix. Chloromethylation is not used in the preparation of cation resins and therefore, anion resins typically contain higher levels of chlorine than cation resins. Low chloride anion resins suitable for critical applications are available from several suppliers. Analysis of these resins show levels of chlorine ranging from 57 to 1675 µg/kg (B. R. Nott, "An Evaluation of Nuclear Grade Ion Exchange Resins", Ontario Hydro Research Division Report No. 81-42-H, Mar. 4, 1981), likely including both organic and inorganic chlorine compounds.

The chlorine content of ion exchange resins used in nuclear applications must be relatively low, and preferably no higher than 70 mg Cl/kg of moist resin, due to the possibility of chloride-induced stress corrosion cracking of stainless steel components in nuclear reactors.

Sodium may be present in ion exchange resins as a salt of residual organic acids such as organic sulfonic acids and residual regenerants. In order to minimize neutron activation products in nuclear reactors, the maximum acceptable level of sodium in new resins for CANDU reactors has been specified as 100 mgNa/kg of moist resin (Ontario Hydro Standard Specification No. M-678-86, January 1986, and Draft No. 1 of Revision to Standard Specification for Resin, Ion Exchange, Nuclear Grade Type: Strong Acid/Strong Base, Material Management Department Document No. M-678-xx (not issued yet), File 178.2-929-7, Job S0193, Dec 15, 1988).

Extraction of leachable impurities from ion exchange resins using supercritical fluids offers several key advantages over known methods using liquid solvent washes. For example, the low viscosity and high solute diffusivity of supercritical fluids provide superior mass transfer characteristics and thereby enable faster extraction fluxes, and the low surface tension of supercritical fluids enables superior penetration into microporous solid matrices.

The preferred supercritical fluid used to extract impurities in the method of the present invention is supercritical carbon dioxide, which is non-toxic, inexpensive, recyclable, and possesses a low critical temperature (31° C.) and pressure (1071 psi). The inventors have found that extraction under these supercritical conditions surprisingly does not adversely affect the chemical reactivity of ion exchange resins and, as discussed in more detail below, actually increases the initial activity of ion exchange resins.

The method of the present invention is preferably carried out in a conventional supercritical extraction apparatus, comprising a source of supercritical carbon dioxide, typically a storage and supply cylinder, an extractor vessel and a scrubber. A quantity of resin beads is loaded into the extractor vessel, which is then sealed. Carbon dioxide is then supplied from the source to the vessel through a pressure line under supercritical conditions, that is, at a temperature of at least 31° C. and a pressure of at least 1,071 psig. The resin is exposed to the supercritical carbon dioxide in the vessel for a period of time depending on the amount of leachable material to be extracted from the resin. At the end of this time, the supercritical carbon dioxide containing extracted impurities is drained from the vessel and is allowed to expand to its gaseous state as it passes through the scrubber, thereby separating out the organic and inorganic contaminants, which are generally either liquids or solids. The scrubbed carbon dioxide is then vented through an exhaust to the atmosphere or may alternatively be recycled and recompressed and returned to the supercritical carbon dioxide storage and supply cylinder.

In particularly preferred embodiments of the invention, the interior of the extractor vessel is maintained at a temperature of at least about 31° C. which does not result in damage to the resin beads. Preferably, the temperature is not higher than about 100° C., and is more preferably from about 40 to about 70° C., even more preferably from about 50 to about 60° C., and most preferably about 55° C.

During the extraction, the pressure inside the extractor vessel is preferably maintained at not less than about 1,071 psig, in order to maintain the carbon dioxide in a supercritical state, and preferably is not raised to a pressure at which the resin beads are damaged. The inventors have found a suitable upper limit for the pressure to be about 5,000 psig. Preferably, the time of extraction is at least about ½ hour, more preferably from about ½ to about 3 hours, and even more preferably from about ½ to about 1 hour, depending on the extraction conditions and the amount of impurities which are to be removed.

In general, the higher the mechanical compression of a supercritical fluid, the higher its solvent power. The inventors have found the variation in solvent power brought about by varying the pressure actually increases the efficiency of the extraction, most likely due to the fact that the variation in solvent power causes the supercritical carbon dioxide to leach out impurities of various polarities, similar to using a series of liquid solvents of varying polarities to wash out a range of impurities. Most preferably, the pressure inside the extractor vessel is gradually increased from about 1,071 psig during the course of the extraction in order to achieve the desired progression in solvent power. More preferably, the pressure in the extractor vessel is gradually raised during the extraction from about 1,071 psig to about 5,000 psig over a period of about 30 minutes and is held at 5,000 psig for the remainder of the extraction, which may preferably comprise an additional 30 minutes.

Another particularly preferred embodiment of the present invention involves using "dynamic" conditions during the extraction, meaning that a flow of supercritical carbon dioxide into and out of the extractor vessel is maintained during at least part of the extraction process. Preferably, the flow rate of supercritical carbon dioxide into the vessel is the same as the flow rate leaving the vessel, such that the pressure and temperature conditions inside the vessel remain constant. In a particularly preferred embodiment, the extraction is carried out over a period of about 15 minutes under static conditions, after the temperature and pressure have reached a steady state, followed by 15 minutes under dynamic conditions with a flow rate of supercritical carbon dioxide of 20 mL/min. through the vessel.

The inventors have also found that the method of the invention is also effective to increase the initial operating capacity of ion exchange resins, particularly anion exchange resins, most likely due to the removal of organic impurities which block reactive sites on the surface of the resin bead. The method of the invention is also expected to increase the useful life of ion exchange resins, particularly anion resins, by reducing the incidence of fouling caused by coating of the surface of the anion resins with organic sulfonic acid impurities leached from the resin beads over time.

In addition, the method of the invention is expected to permit regeneration of ion exchange resins which have been fouled by organic impurities other than those which are leached from the resin matrix of the ion exchange resin. Specifically, the method of the invention is expected to be useful in "cleaning up" anion exchange resins which have become fouled by water-borne organics found in natural water, for example humic acid, fulvic acid, tannins, lignins and other products from plant decay.

An additional advantage of the method of the invention is that the treatment of an anion resin with supercritical carbon dioxide is expected to convert the resin from its chloride form to either its carbonate or bicarbonate form. Anion resins must typically be converted from their chloride form to their hydroxide form prior to use. However, the chloride form cannot be quantitatively converted to the hydroxide due to selectivity coefficients of the resin. Therefore, in the prior art an intermediate step has typically been used to first convert the resin from the chloride form to the carbonate, bicarbonate or bisulfate form, followed by treatment with sodium hydroxide to convert the resin to its hydroxide form. This intermediate step is effectively eliminated by the method of the present invention.

EXAMPLES

The effectiveness of the method of the invention in removing contaminants from ion exchange resins is now illustrated by a series of examples in which a number of different ion exchange resins are examined for leachable contaminants both before and after supercritical carbon dioxide extraction.

Figure 1B:
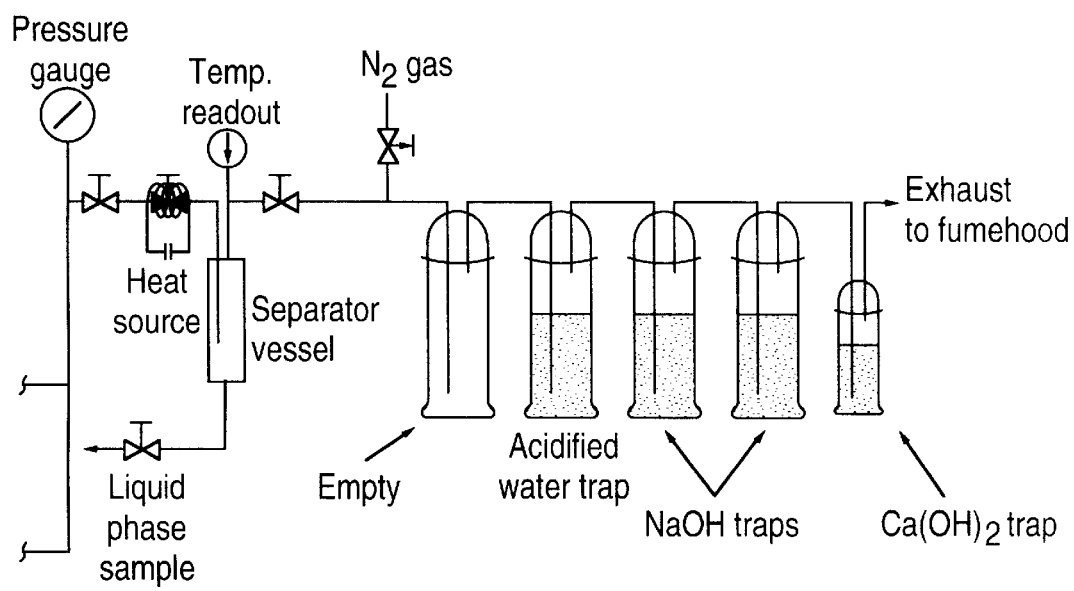

In the following examples, all supercritical carbon dioxide extractions were carried out under static conditions at 55° C. and 5000 psig using a Supercritical Extraction Screening System (Catalogue No. 08U-06-60-FS) from Autoclave Engineers Group, Erie, Pa., with a maximum operating pressure of 6000 psi at 460° F., and a tubular extractor vessel of 75 mL volume. High purity supercritical carbon dioxide from Union Carbide was used throughout. The experimental set-up used is schematically illustrated in FIG. 1. The conditions chosen for supercritical $CO_2$ extract ions did not appear to affect the physical integrity of the resin. The effect of supercritical $CO_2$ on resin samples was studied using several characteristics.

Example 1

Total Organic Carbon (TOC) in Water Extracts

Water extractable organics from resin samples were determined by continuously shaking 20 g of the resin before supercritical carbon dioxide extraction or 5 g of resin after supercritical carbon dioxide extraction in 50 mL of deionized water at 55° C. for 72h.

Table 1 shows the result s of water extractions of several commercially available resins before and after extraction with supercritical carbon dioxide. Ambersep™ 440E/OH is the strong base anion resin that is used by Rohm and Haas Company to produce low chloride nuclear grade IRN™ 78 by a proprietary process, and Amberlite™ IR 120 Plus/H is the corresponding precursor for the nuclear grade strong acid cation resin, IRN 77. It is interesting to note from Table 1 that both nuclear grade resins IRN 77 and IRN 78 appear to have higher levels of leachable organics in their matrices. It is not clear whether this is a result of their proprietary treatment. The anion generally makes a greater contribution to the TOC value due to the more unstable amine functional group (F. P. Scanlan and J. F. Muller, "An Analytical Investigation of the Thermal Degradation of a Cation-Exchange Resin—Part 2" *Journal of Analytical and Applied Pyrolysis*, Vol. 16, pp. 269–289, 1989; Shing-Jen Shiao and Chiao-Ming Tsai, "Stability of Anion Resin", *Nuclear Science Journal*, Vol.27, No. 6, p 523–536, 1990). The high TOC value shown in Table 1 for IRN 78 after the supercritical $CO_2$ extraction is suspect and it is more than likely due to an analytical error.

TABLE 1

Water-Extractable Organics in Ion Exchange Resins as Total Organic Carbon (TOC)-(in µg/g of resin)

| Sample | Description | TOC before SC-$CO_2$ | TOC after SC-$CO_2$ | % Removal |
|---|---|---|---|---|
| Ambersep 440E/OH | Strong Base Anion Resin (SBA) | 127 | 106 | 16 |
| Amberlite IR 120 Plus/H | Strong Acid Cation Resin (SAC) | 157 | 127 | 19 |
| IRN 77 | Strong Acid Cation Resin (SAC) | 233 | 198 | 15 |
| IRN 78 | Strong Base Anion Resin (SBA) | 208 | 413 | −98 |
| IRN 150 +SBA | Mixed-Bed of SAC | 14 | 22 | −57 |
| IRN 154 | *Mixed Bed of SAC + SBA | 25 | — | — |
| "Blank" (deionized water with no resin added) | — | 0.9 | — | — |

*Strong Acid Cation Resin in Lithium form

Thus, it can be seen that a 15–19% change in the water-extractable organics is brought about by supercritical carbon dioxide extraction. These samples were analyzed following filtration through 0.2 µm filters, and hence these measurements reflect only soluble organic residues, and not the total reduction of the organic residues from the resin. The anion resin samples appeared lighter and brighter after the supercritical $CO_2$ extraction, and more importantly produced a significantly diminished odour. Supercritical $CO_2$ is a non-polar solvent and hence highly polar and insoluble materials may not have been extracted completely. This problem can be addressed through use of co-solvents such as methanol which enhances the solubilizing power of the extracting medium (R. F. Cross, J. L. Ezzell, N. L. Porter, and B. E. Richter, "Fluid Composition Sources and Flexibility in Supercritical Fluid Extraction", American Laboratory, 12–17, August, 1994).

Example 2

Elemental Analysis for Chemical Composition

In order to gain an insight into the nature of any chemical compositional changes in the resin brought about by the extraction with supercritical $CO_2$, the samples of ion exchange resins were analyzed for their elemental composition before and after the supercritical $CO_2$ extraction. The elemental analysis including total chlorine and sodium analysis of resin samples were performed by Chemisar Laboratories Inc., Guelph, Ontario. The results are summarized in Tables 2 and 3.

TABLE 2

Elemental Analysis of IX Resins (%)

| Sample | Description | *Before SC—$CO_2$ | | | | | After SC—$CO_2$ | | | | |
|---|---|---|---|---|---|---|---|---|---|---|---|
| | | C | H | N | O | S | C | H | N | O | S |
| Ambersep 440E/OH | Strong Base Anion Resin (SBA) | 37.51 | 10.53 | 2.62 | 48.34 | — | 37.89 | 9.82 | 2.72 | 44 | — |
| Amberlite IR 120 Plus/H | Strong Acid Cation Resin (SAC) | 33.45 | 7.26 | — | 48.86 | 10.89 | 28.81 | 7.29 | — | 49.88 | 9.44 |
| IRN 77 | Strong Acid Cation Resin (SAC) | 28.69 | 7.78 | — | 48.43 | 9.4 | 29.15 | 7.58 | — | 50.43 | 9.49 |
| IRN 78 | Strong Base Anion Resin (SBA) | 34.81 | 10.69 | 2.81 | 45.03 | — | 37.97 | 6.28 | 2.86 | 45.83 | — |
| IRN 150 | Mixed-Bed of SAC + SBA | 45.71 | 9.96 | 3.28 | 38.15 | 0.3 | 37.99 | 8.26 | 1.42 | 38.26 | 5.95 |
| Potassium Hydrogen Phthalate (submitted as an "unknown") | Monopotasium salt of aromatic dicarboxylic acid | 46.62 (47.05) | 2.39 (2.47) | 0.03 (0.00) | 31.03 (31.34) | — | — | — | — | — | — |

*The expected percentages are shown in parentheses.

The percentage of elements in the composition is a function of the moisture content of the resin and this is likely to change as a result of the supercritical $CO_2$ extraction. The ratio of C:N and C:S is generally a good indication of the relative amounts of functional groups present in the resin. The results shown in the Tables clearly indicate that no significant change in the functional groups has been brought about by the extraction with supercritical carbon dioxide.

TABLE 3

Impact of SC—$CO_2$ Extraction on Functional Group Distribution

| Sample | Description | Ratio of Elements before SC—$CO_2$ | | | Ratio of Elements after SC—$CO_2$ | | |
|---|---|---|---|---|---|---|---|
| | | C/N | C/S | H/O | C/N | C/S | H/O |
| Ambersep 440E/OH | Strong Base Anion Resin (SBA) | 16.69 | — | 3.46 | 16.24 | — | 3.54 |
| Amberlite IR 120 Plus/H | Strong Acid Cation Resin (SAC) | — | 8.21 | 2.36 | — | 8.15 | 2.32 |
| IRN 77 | Strong Acid Cation Resin (SAC) | — | 8.15 | 2.55 | — | 8.19 | 2.39 |
| IRN 78 | Strong Base Anion Resin (SBA) | 14.44 | — | 3.77 | 15.47 | — | 2.17 |
| IRN 150 | Mixed-Bed of SAC + SBA | 51.27 | 1284 | 4.14 | 31.18 | 17.04 | 3.43 |

TABLE 3-continued

Impact of SC—$CO_2$ Extraction on Functional Group Distribution

| Sample | Description | Ratio of Elements before SC—$CO_2$ | | | Ratio of Elements after SC—$CO_2$ | | |
|---|---|---|---|---|---|---|---|
| | | C/N | C/S | H/O | C/N | C/S | H/O |

*The average chlorine content from NAA of 5 X 1 g samples of IRN 78 had been found to be 60 µg/g resin (B.R. Nott, "Electrolytic Process for Producing Extremely Low Chloride Anion Exchange Resins", U.S. Pat. No. 4690739, Sept. 1/1987). After processing, this value was reduced to 30 µg/g resin.

The significant change in the C:S ratio for IRN 150 after the SC-$CO_2$ extraction may be due to the inhomogeneity of the mixed-bed sample taken for analysis.

In order to avoid the effects of variable amounts of water and the possible conversion of the resin to its carbonate form during supercritical $CO_2$ extraction, the elemental analysis was performed on pre-treated and vacuum dried resin samples. The pre-treatment consisted of converting a batch of Ambersep 440E resin into carbonate form, wet-sieving to fractions held between US mesh 30 and 40, and removing free water under standard conditions to produce moist resin. After supercritical $CO_2$ extraction, the resin was dried in a vacuum desiccator to constant weight. The strong acid cation resin was not regenerated but otherwise was treated the same way. The results of this analysis are shown below in Table 4.

TABLE 4

Elemental Analysis of Vacuum-dried IX Resins (%)
(Anion resin in the carbonate form; average of two analyses)

| Sample | Description | Before SC—$CO_2$ | | | | | After SC—$CO_2$ | | | | |
|---|---|---|---|---|---|---|---|---|---|---|---|
| | | C | H | N | O | S | C | H | N | O | S |
| Ambersep 440E/OH | Strong Base Anion Resin (SBA) | 59.47 | 8.44 | 4.40 | 24.26 | — | 56.77 | 8.93 | 4.22 | 25.33 | — |
| Amberlite IR 120 Plus/H | Strong Acid Cation Resin (SAC) | 40.90 | 5.70 | 0.03 | 36.05 | 13.45 | 40.56 | 5.82 | 0.03 | 35.16 | 13.13 |

The elemental composition of both anion and cation resin remains essentially unchanged during supercritical carbon dioxide extractions, confirming that no loss of functional groups or the resin integrity.

Example 3

Total Chlorine Content in Resin

As shown below in Table 5, the neutron activation analysis of resin samples for chlorine content before and after supercritical $CO_2$ extraction shows changes for the anion resin, Ambersep 440E/OH. As mentioned above, previous analysis of low chloride anion resins from several commercial suppliers had produced values ranging from 57 to 1675 $\mu$g/kg. The corresponding values for cation resins were 13 to 40 $\mu$g/kg. The observed 20% change in the chlorine content for the anion resin in Table 5 is attributable to extraction of organochlorines from the resin matrix.

TABLE 5

Neutron Activation Analysis of Chlorine in Resins (ppm)

| Sample | Description | Before SC-$CO_2$ | After SC-$CO_2$ | % Removal |
|---|---|---|---|---|
| Ambersep 440E/OH | Precursor of Nuclear grade Strong Base Anion Resin (SBA) | 120 | 94 | 21.7 |
| Amberlite IR 120 Plus/H | Precursor of Nuclear Grade Strong Acid Cation Resin (SAC) | <10 | <10 | 0 |
| IRN 77 | Nuclear Grade Strong Acid Cation Resin (SAC) | <10 | <10 | 0 |
| IRN 78 | Nuclear Grade Strong Base Anion Resin (SBA) | 74 | 74 | 0 |
| IRN 150 | Nuclear Grade Mixed-Bed of SAC + SBA | 45 | 46 | −2.2 |

Example 4

Total Sodium Content in Resin

The resin samples were analyzed before and after supercritical extraction and the results are given below in Table 6.

TABLE 6

Analysis of Sodium in Resins (%)

| Sample | Description | Before SC-$CO_2$ | After SC-$CO_2$ | % Removal |
|---|---|---|---|---|
| Ambersep 440E/OH | Precursor of Nuclear grade Strong Base Anion Resin (SBA) | 0.037 | 0.008 | 78 |
| Amberlite IR 120 Plus/H | Precursor of Nuclear Grade Strong Acid Cation Resin (SAC) | 0.040 | 0.032 | 20 |
| IRN 77 | Nuclear Grade Strong Acid Cation Resin (SAC) | <0.001 | <0.001 | 0 |
| IRN 78 | Nuclear Grade Strong Base Anion Resin (SBA) | <0.001 | 0.010 | N/A |
| IRN 150 | Nuclear Grade Mixed-Bed of SAC + SBA | 0.012 | 0.002 | 83 |

It is seen from Table 6 that anion resin shows a considerable loss of sodium as a result of the supercritical $CO_2$ extraction. Considering the manufacturing steps involved, anion resin is much more likely to possess sodium impurities from reagents. The fact that most of them are removed by supercritical $CO_2$ treatment suggests that they are present in the resin as somewhat less polar sodium salts of organic acids. The cation resin, as would be expected, experiences relatively lower sodium removal.

Example 5

FID Profile of Leachate by SFE/SFC

Attempts to obtain FT-IR spectra of extractables from supercritical fluid extraction (SFE) coupled with supercritical fluid chromatography (SFE) were not successful due to relatively large amounts of water associated with the resin. Even use of several drying agents such as Celite (3:1) and Hydromatrix (3:1) was not helpful. Hence the extracts were characterized by a flame ionization detector.

FID profiles of leachates were obtained by the Department of Chemistry of Virginia Polytechnic Institute and State University, Blacksburg, Va., following Supercritical Fluid Extraction (SFE)/Supercritical Fluid Chromatography (SFC). For SFE, 100 mg of sample pre-mixed with 300 mg of Hydrometrix™ (inorganic-based desiccant from Varian Associates) were treated with supercritical carbon dioxide at 60° C. and 300 atm., for 15 min at 2 mL/min liquid $CO_2$ and the extractables trapped in a cryotrap at −10° C. SFC was performed on a cyanopropyl column (10 cm ×1.0 mm) with 5μm (i.d.) particles. The trap temperature was set at 80° C. and the elution was performed with supercritical $CO_2$ at 60° C. and 150 atm for 2 min, followed by 15 min linear ramp from 150–350 atm at the same temperature. The entire on-line analysis was performed on a Suprex MPS/225 instrument and a 3 mL vessel and a FID detector.

Figure 2A:
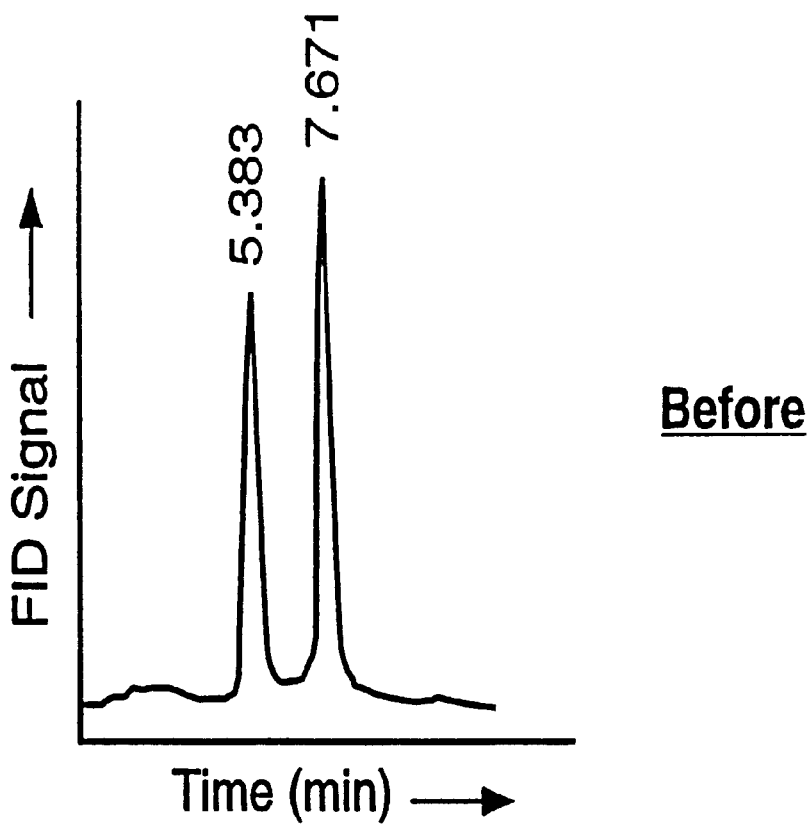
FIG. 2 is a graphical representation of the FID profile of leachate from Ambersep 440E ion exchange resin before and after supercritical carbon dioxide extraction.
Figure 2B:
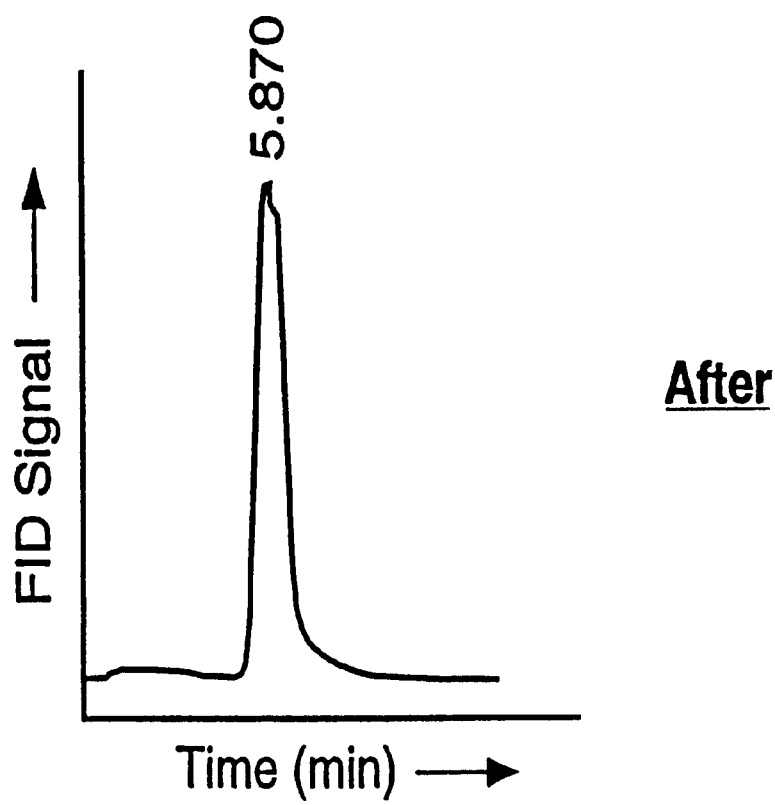
Figure 3A:
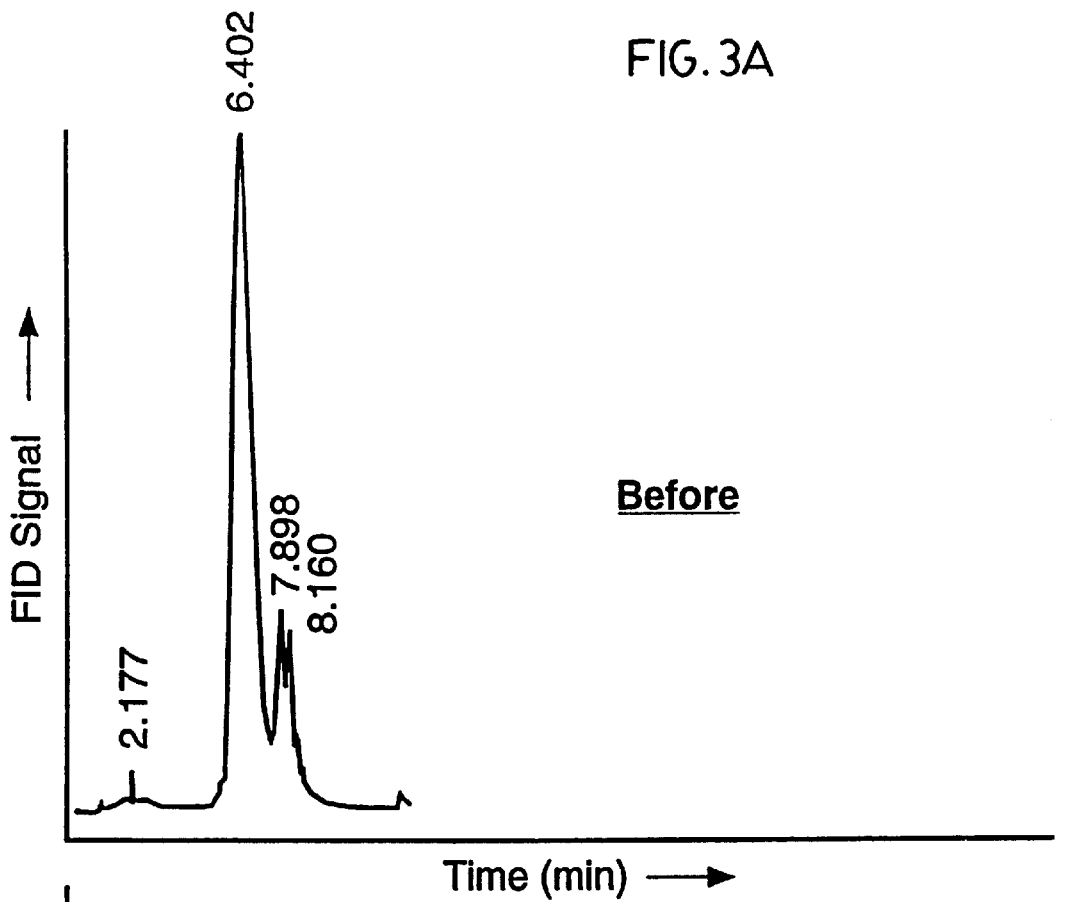
FIG. 3 is a graphical representation of the FID profile of leachate from Amberlite 120 Plus/H ion exchange resin before and after supercritical carbon dioxide extraction.
Figure 3B:
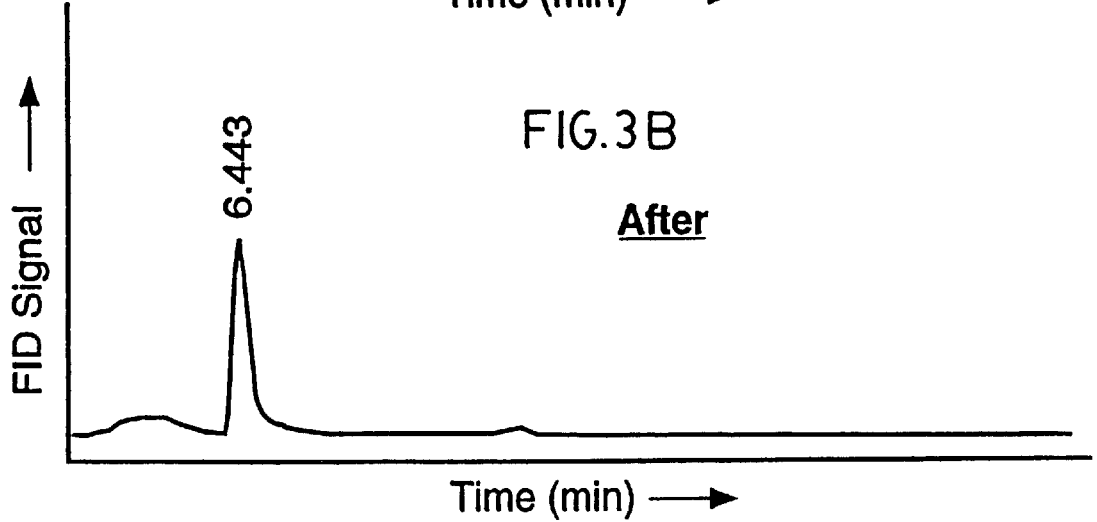

The SFE/SFC process was performed under identical conditions on the commercial grade samples of cation and anion resins before and after supercritical carbon dioxide extraction. The resultant spectra for Ambersep 440E and Amberlite 120 Plus/H are respectively illustrated in FIGS. 2 and 3. As can be seen from FIGS. 2 and 3, the FID profiles of both cation resin and anion resin show fewer and smaller peaks after the supercritical $CO_2$ extraction. These peaks are due to organic materials that have leached out during SFE/SFC and clearly indicate the reduction of extractables due to exposure to supercritical $CO_2$.

Example 6

Effect of Supercritical $CO_2$ Extraction on Reaction Kinetics

A major step determining the rate of ion exchange reaction is the diffusion of reactants and products to and from the site of exchange (R. R. Harries and M. Ball, "An Fquilibrium Versus Kinetics in Water Purificalion". In: P. A. Williams and M. J. Hudson, eds. "Recent Developments in Ion Exchange", Ed, Elsevier Applied Science, (ISBN 1-85166-101-8), 1987: 402–418). Removal of organic residues blocking the passages leading to these exchange sites is expected to enhance the reaction kinetics.

Experiments were conducted to confirm this both with cation exchange and anion exchange reactions with the respective ion exchange resins. These experiments comprised a kinetics study of carbonate exchange which was carried out by exposing the resin (pre-screened to 30 to 40 U.S. mesh size in the carbonate form and reconverted to hydroxide form) to a solution of sodium carbonate traced with $^{14}CO_3^{2-}$ and monitoring the C-14 activity change in the supernatant solution by periodic sampling. Similarly, the cobalt uptake was carried out using cobalt nitrate solution containing a trace of Co-60. Both C-14 and Co-60 levels were measured by liquid scintillation counting following calibration with standards.

Figure 4:
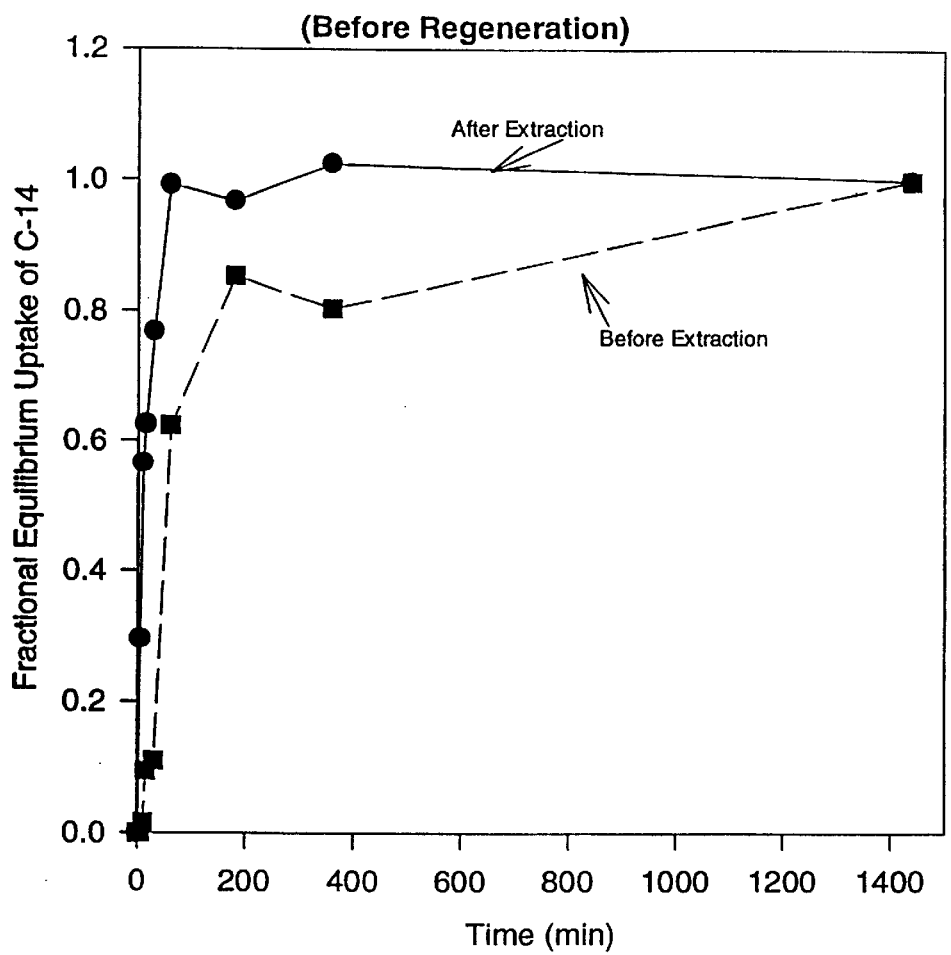
FIG. 4 is a graphical representation of the effect of supercritical carbon dioxide extraction on C-14 uptake by Ambersep 440E/OH ion exchange resin before regeneration to the OH form.
Figure 5:
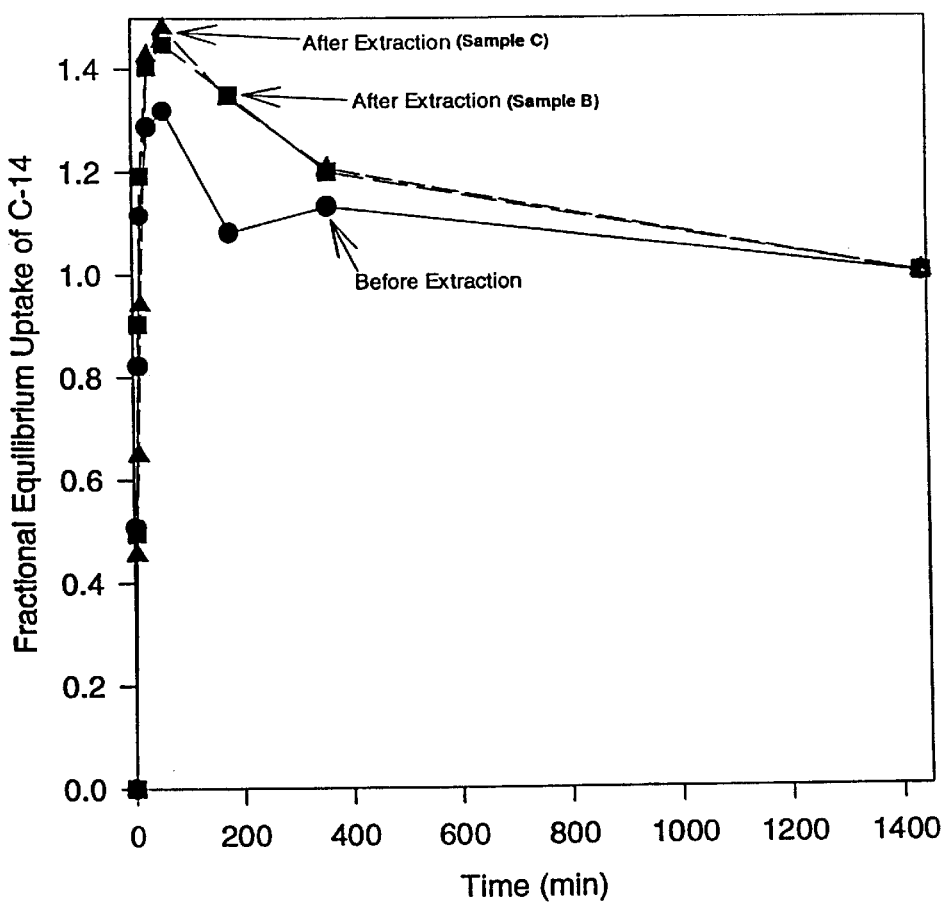
FIG. 5 is a graphical representation of the effect of supercritical carbon dioxide extraction on C-14 uptake by Ambersep 440E/OH ion exchange resin after regeneration to the OH form.

FIG. 4 illustrates the difference in the rate of carbonate anion exchange between the "as-received" form of the Ambersep 440E/OH resin, which is the precursor of the nuclear grade strong base anion exchange resin IRN 78, and the supercritical $CO_2$ extracted sample of the same resin. There is clearly a significant enhancement in the rate of uptake of the carbonate ion by the resin after the supercritical $CO_2$ extraction/treatment. However, it should be noted that after the supercritical $CO_2$ extraction, the counter ion in the resin may have been changed to $CO_3^{2-}$ from the original $OH^-$. Hence, the experiment was repeated several times after regenerating the resin following supercritical $CO_2$ extraction, to the $OH^-$ form. Still, a noticeable enhancement can be seen (FIG. 5) in the carbonate uptake following supercritical carbon dioxide extraction. The exchange profile from two repeat experiments (samples B and C) are virtually superimposable. It was also observed that in all exchange experiments performed using identical amounts of carbonate solution and resin, the C-14 absorption by the resin reached a maximum at about 60 minutes from the beginning of exposure. The "Blank" solution (with no resin added) run in parallel did not show any significant variation in C-14 content in the solution. This appears to be due to an increase in the pH of the solution brought about by exchanging $OH^-$ ions from the resin, followed by absorption of carbon dioxide from the surrounding atmosphere. The carbonate absorption profile shown in FIG. 6 is typical of this behaviour. The observations extended later up to 74h indicated further gradual decrease of the C-14 uptake by the resin. At the 60 min absorption maximum, the supercritical carbon dioxide extracted resin showed a 8–10% increase in the uptake of C-14 per g of dry resin. Under dynamic conditions (column runs) this difference is expected to be even larger and could translate to much higher operating capacities.

A similar enhancement of the exchange of cations was seen with Amberlite IR 120, which is the precursor for the nuclear grade strong acid cation resin IRN 77 manufactured by Rohm and Haas Co., when cobalt cation uptake was monitored using Co-60 radio tracer. These results are shown in FIG. 7.

Although the invention has been described in connection with certain preferred embodiments, it is to be understood that it is not restricted thereto. Rather, the invention is intended to include all embodiments as may fall with the scope of the following claims.

What is claimed is:

1. A method for extracting a leachable contaminant from an ion exchange resin, comprising:
   (a) contacting the resin with supercritical carbon dioxide in an extraction vessel for a sufficient interval of time to allow at least a portion of said leachable contaminant to be solubilized by said supercritical carbon dioxide; and
   (b) removing from the resin the supercritical carbon dioxide having said leachable contaminant dissolved therein;
   wherein said step (a) includes a first period of time in which the solvent power of the supercritical fluid is increased by increasing supercritical carbon dioxide pressure in the extraction vessel, and a second period of time during which the resin is contacted with said supercritical carbon dioxide under dynamic conditions in which a flow of said supercritical carbon dioxide is maintained into and out of said extraction vessel.

2. The method of claim 1, wherein the leachable contaminant is an organic compound.

3. The method of claim 1, wherein the organic compound contains one or both of sodium and chlorine.

4. The method of claim 1, wherein said step (a) of exposing the resin to supercritical carbon dioxide is carried out at a temperature of at least 31° C. and a pressure of at least 1,071 psi.

5. The method of claim 4, wherein said temperature is from 31° C. to about 100° C.

6. The method of claim 5, wherein the temperature is about 55° C.

7. The method of claim 3, wherein the pressure is between 1,071 psi and about 5,000 psi.

8. The method of claim 1, wherein the dynamic conditions include a pressure of about 5,000 psi.

9. The method of claim 4, wherein said step (a) of exposing the resin to supercritical carbon dioxide is carried out for a period of from about 30 minutes to about 3 hours.

10. The method of claim 9, wherein the resin is exposed to carbon dioxide for a period of about 30 minutes to about 1 hour.

11. The method of claim 4, wherein the pressure is gradually increased from about 1,071 psi to about 5,000 psi during said first time period of said step (a), and the pressure is maintained at about 5,000 psi for the remainder of said step (a), including said period of time during which the resin is contacted with said supercritical carbon dioxide under said dynamic conditions.

12. The method of claim 11, wherein the pressure is gradually increased from about 1,071 psi to about 5,000 psi over a period of from about 30 minutes.

13. The method of claim 1, wherein said flow of supercritical carbon dioxide is about 20 mL/min.

14. The method of claim 1, wherein said step (a) further comprises contacting said resin with supercritical carbon dioxide for about 15 minutes under static conditions after said first time period, followed by said second time period during which the resin is contacted with said supercritical carbon dioxide under dynamic conditions.

15. The method of claim 14 wherein, during said second time period, the resin is contacted with said supercritical carbon dioxide for about 15 minutes under dynamic conditions.

16. The method of claim 1, wherein said step (a) comprises:
 (i) gradually increasing the pressure from about 1,071 psi to about 5,000 psi at a temperature of from 31° C. to about 100° C. during said first time period;
 (ii) contacting the resin with said supercritical carbon dioxide under static conditions at a pressure of about 5,000 psi; and
 (iii) contacting the resin with said supercritical carbon dioxide under said dynamic conditions during said second time period.

* * * * *